April 24, 1962 — P. V. HARMON ET AL — 3,031,559
ELECTRICALLY HEATED BOILER
Filed June 23, 1960 — 2 Sheets-Sheet 1
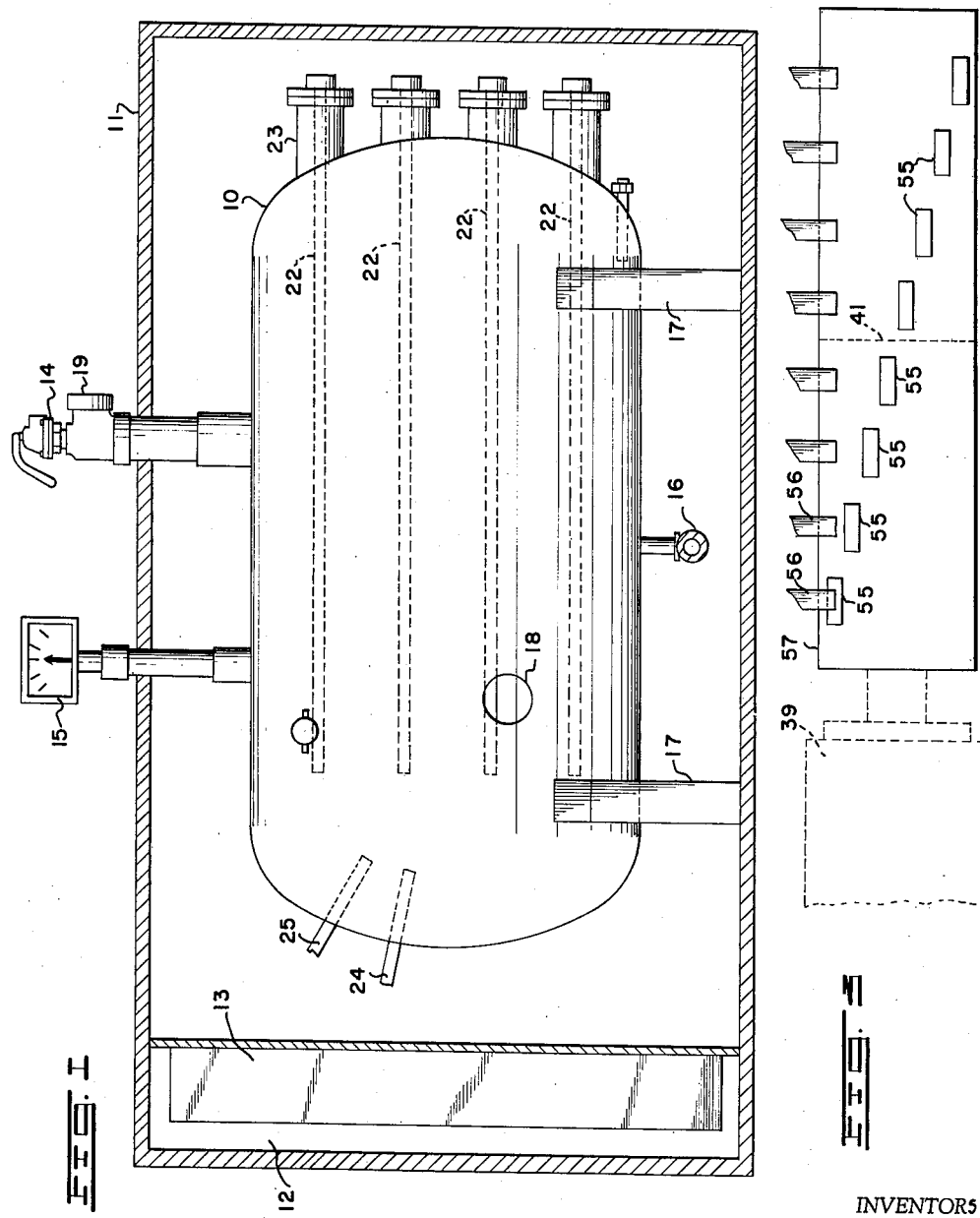
INVENTORS
PAUL V. HARMON
LYLE P. CARPENTER
BY John V. Phillips
ATTORNEY April 24, 1962 P. V. HARMON ET AL 3,031,559
ELECTRICALLY HEATED BOILER
Filed June 23, 1960 2 Sheets-Sheet 2
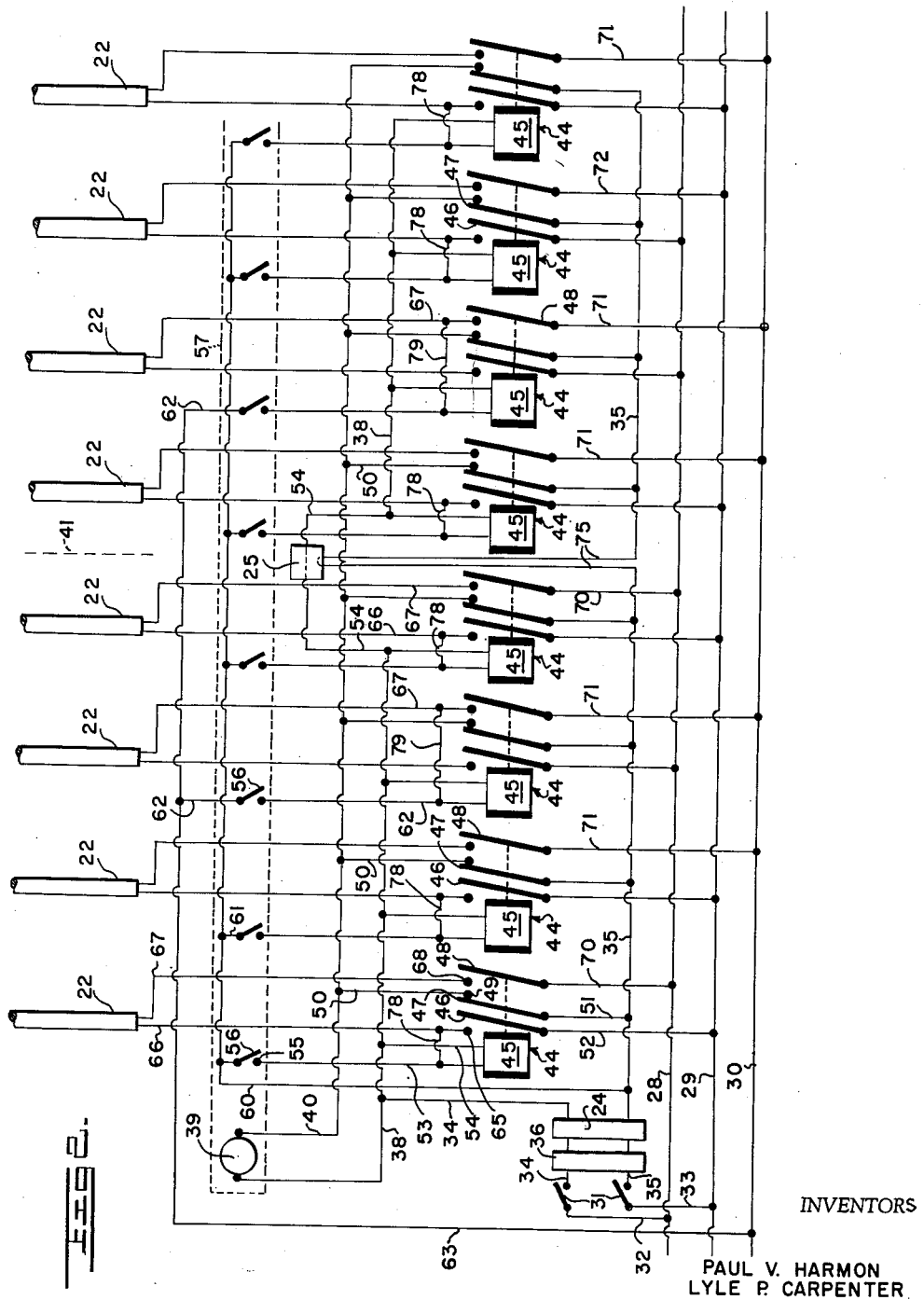
INVENTORS
PAUL V. HARMON
LYLE P. CARPENTER
BY
John F. Phillips
ATTORNEY

United States Patent Office 3,031,559
Patented Apr. 24, 1962

3,031,559
ELECTRICALLY HEATED BOILER
Paul V. Harmon and Lyle P. Carpenter, Nashville, Tenn., assignors to Precision Parts Corporation, Nashville, Tenn., a corporation of Tennessee
Filed June 23, 1960, Ser. No. 38,216
8 Claims. (Cl. 219—20)

This invention relates to an electrically heated boiler, and more particularly to such a boiler especially adapted for use in heating the circulating hot water for heating homes and other buildings.

An important object of the invention is to provide a boiler in which the water is heated by conventional immersion heating elements and wherein a novel system of controlling the connection of the heating elements to the source of current is employed to progressively turn on the heating elements to avoid the subjection of the source to sudden relatively heavy loads.

A further object is to provide such a system wherein a timing mechanism is employed in conjunction with suitable thermostats for successively closing circuits to energize successive heating elements, thus avoiding sudden loads on the source of current.

A further object is to provide such a system particularly adapted for the use of banks of heating elements and to provide novel means for successively cutting in the heating elements of one bank, followed by the cutting in of the heating elements of successive banks only if necessary to bring the water temperature up to the desired point.

A further object is to provide a system of this character wherein holding circuits are provided whereby the connection of the first and successive heating elements of a bank to the source of current maintains such connection automatically until the water temperautre rises to a predetermined point, thus providing a system wherein the heating elements are cut in successively to avoid sudden heavy loads on the source of current, and wherein all of the heating elements are disconnected from the source when the proper temperature is reached.

A further object is to provide a system of the character referred to wherein a master thermostat closes the circuit to a timer motor to initiate the operation of the timer to thereby successively turn on the heating elements of the first bank of such elements, after which another thermostat, or a plurality of thermostats depending on how many banks of heating elements are used, will be closed if necessary to render the timing mechanism operative for successively turning on the heating elements of successive banks of such elements.

A further object is to provide a system of this character particularly adapted for use with a three-phase circuit, and to so connect the holding circuit wires for the heating elements as to distribute the load across different pairs of wires of the main circuit.

Other objects and advantages of the invention will become apparent during the course of the following description.

In the drawings we have shown one embodiment of the invention. In this showing:

FIGURE 1 is a side elevation of a boiler in position in a protective housing, the latter being shown in section;

FIGURE 2 is a wiring diagram for the system showing all of the switch elements in normal positions; and FIGURE 3 is a diagrammatic view of the timer and associated brushes, it being understood that the timer body is cylindrical and is diagrammatically shown laid out flat to illustrate all of the contacts necessary for the system shown in FIGURE 2.

Referring to FIGURE 1, the numeral 10 designates a boiler as a whole housed in a casing 11 in one end of which is a compartment 12 containing a control panel or box 13 carrying a number of the switches for the system, and also housing the timer mechanism. The boiler is provided with the usual relief valve 14 and pressure-temperature gage 15, the bottom of the boiler being provided with the usual drain 16. The boiler is supported on the bottom of the housing 11 by suitable supporting cradles 17. The boiler is provided with the usual opening 18 for connection with the water return pipe, while the relief valve 14 is mounted at the top of an ell forming the hot water outlet 19. It will be understood that when the system is used in connection with the heating of a building, suitable piping will lead from the outlet 19 to the radiators of a building and a suitable return pipe will be connected to the opening 18.

In FIGURE 1 there are shown four immersion heating elements 22, preferably of conventional rod type supported by fittings 23 in one end of the boiler. In the present embodiment of the invention four heating elements 22 are employed in each bank, and the four elements showing in FIGURE 1 may be considered the heating elements of one such bank. The heating elements of the remaining bank or banks may be considered to be directly in line with the heating elements 22 as they show in FIGURE 1. Master and auxiliary thermostats 24 and 25, respectively, project into one end of the boiler as shown in FIGURE 1. These thermostats are provided with conventional switches (not shown) and it may be considered that the elements 24 and 25 each comprises a thermostat and its associated switch.

Referring to FIGURE 2, the system is operative in conjunction with the three-phase circuit the wires of which are indicated by the numerals 28, 29 and 30. A double-pole switch 31 is connected as at 32 and 33 with the wires 28 and 29 respectively. The switch 31 is a manually controlled main switch and is adapted to be closed to connect the wires 32 and 33 to wires 34 and 35 leading through a higher temperature cut-off switch 36 which may be located at any point within the boiler to make certain that the main circuit leading through wires 32 and 33 will cut off at a predetermined high temperature point. The high temperature switch 36 is auxiliary in nature and need not be employed.

The wires 34 and 35 pass through the thermostatic switches 36 and 24 as shown in FIGURE 2. The wire 34 is connected to a line 38 leading to one pole of a timer motor 39, the other pole of which is connected to a wire 40 leading to various switch contacts, as further described below. The wire 35, as also described below, is connected to various switch arms associated with solenoid operated switches.

As stated above, four heating elements 22 are employed in each bank of such elements and these two banks may be considered theoretically as being divided as indicated by the dotted line 41 in FIGURE 2. Each heating element is associated with a solenoid operated switch and with two banks of four heating elements, therefore, there will be eight solenoid operated switches, each of which is indicated as a whole by the numeral 44. Each solenoid switch comprises a solenoid 45 and three switch arms 46, 47 and 48, each switch arm 47 normally being closed and in engagement with a contact 49 connected by a wire 50 to the wire 40. Each normally closed switch arm 47 is connected by a wire 51 to the wire 35 as shown. The switch arms 46 are individually connected as at 52 variously to the wires 28 and 29.

Each solenoid 45 is provided with a pair of lines 53 and 54 and each of the lines 54 is connected to the line 38. Each of the lines 53 is connected to a contact 55 engageable with a switch 56 and each switch 56 is in the form of a brush (FIGURE 3) carried by a timer drum 57 driven by the motor 39. Each of the contacts 55 is offset circumferentially from the next preceding contact as shown in FIGURE 3 in which the drum is diagrammatically shown as being opened-out flat for the purpose of illustration. Four of the contacts 55 at the left-hand end of the drum 57 will be associated with the circuits for the first four solenoids 45, that is, the solenoids associated with the first bank of heating elements, the second four switches 55 being similarly associated with the second bank of heating elements. In the position of the parts shown in FIGURE 3, the extreme left-hand switch 56 would be closed, thus connecting the associated wire 53 to a main wire 60 one end of which is connected to the wire 35. Certain of the switches 56, for a reason to be described, are connected by wires 61 to the wire 60 while the remaining switches 56 will be connected by wires 62 to a wire 63 one end of which is connected in the main circuit wire 30.

Each solenoid-operated switch arm 46 is movable into engagement with a stationary contact 65 connected by a wire 66 to one terminal of one of the heating elements 22 and the other terminal of such heating element is connected by a wire 67 to a stationary contact 68 engageable by the third switch arm 48 of each solenoid switch 44. Certain of the switch arms 48 are connected by wires 70 to the wire 28. Other switch arms 48 are connected by wires 71 to the wire 30, while the remaining switches or switch arms 48 may be connected as at 72 to the wire 29. The reason for connecting the switch arms 46 and 48 across different pairs of source wires 28, 29 and 30 is to distribute the load on the source.

When banks of four heating units are employed, the fourth wire 54, leading from one terminal of the fourth solenoid 45 will lead to the thermostat switch 25 and such wire 54, when the thermostat switch is closed, will connect such wire 54 to the line 54 to the first solenoid of the second bank. The wire 35 has leads 75 connected to the thermostat switch 25 to normally break the circuit through wire 35 between the two banks of heating units unless the thermostat switch 25 is closed. The wire 54 of the first solenoid of the second bank of heating units is connected to a wire corresponding to the wire 38 previously described and indicated by the same reference numeral. The second wire 38 is connected in the same manner as in the first bank to the solenoids 45.

To balance the load across different pairs of line wires 28, 29 and 30, as suggested above, certain of the wires 66 are connected as at 78 to the associated wire 53. The wire 67 of every third heating unit is connected as at 79 to the associated wire 62.

*Operation*

Assuming that the high temperature cut-off switch 36 and the main control switch 31 are closed and the temperature of the water in the boiler 10 drops below the desired maximum temperature, the thermostat switch 24 will close and accordingly the motor 39 will be energized, the circuit being closed through wires 32, 34 and 38, wire 40 and any of the wires 50, the normally closed associated switch arm 47 and wires 51, 35 and 33. Accordingly the motor 39 will start to slowly rotate the drum 57. Assuming that the first brush 56 is in the position shown in FIGURE 3 engaging the associated contact 55, a circuit will be closed through the first solenoid 45. It will be noted in this connection that one terminal of such solenoid will be connected by wire 54 to the wire 38 of the motor circuit, while the second terminal of such solenoid will be connected through switch 56 with the wire 60 leading to the source wire 29.

When the first solenoid 45 is energized, all three switch arms 46, 47 and 48 will be swung to the left and the timer motor circuit will be broken between switch arm 47 and contact 49. However, a holding circuit will be established for the first heating unit 22. The first switch arm 46 will be moved into engagement with the contact 65 and the circuit for one side of the first solenoid 45 will be maintained from wire 38 through wire 54, solenoid 45, wires 53, 78 and 66, switch arm 46 and wire 52. This maintains a circuit through the first solenoid 45 so that this solenoid remains energized even after the associated brush 56 (FIGURE 3) passes beyond the associated contact 55.

It will be apparent also that the movement of the switch arm 48 into engagement with the contact 68 establishes a circuit through the first heating element 22, the contact 65, now engaged by switch 46, being connected by wire 66 to the first heating element 22 while such element is connected by wire 67, contact 68, switch arm 48 and wire 70 to the line wire 28. Obviously, the first heating element will be connected to the source so long as the holding circuit is maintained energized through the switch arm 46. The circuit through motor 39 remains closed through the normally closed switch arms 47 of the second, third and fourth solenoids 45.

The continued slow rotation of the drum 57 brings the second brush 56 into engagement with the associated contact 55, in which case the same operation as described above in connection with the first solenoid switch 44 occurs with respect to the second solenoid switch, the three switch arms 46, 47 and 48 being moved to open the circuit at the contact 49 and close the circuits through the contacts 65 and 68. A holding circuit also is established by energization of the second solenoid 45, and the second heating element will remain energized after the associated brush or switch arm 56 passes beyond the second contact 55. The same operation occurs successively through the third and fourth solenoid switches, and accordingly it will be apparent that the heating elements 22 of the first bank are successively brought into operation, thus providing for the relatively rapid heating of the water in the boiler without loading all four heating elements 22 onto the source of current at the same time.

The thermostat switch 25 is set to close at a lower temperature than the thermostat switch 24. Assuming that the temperature of the water when the thermostat switch 24 was closed was not sufficiently low to close the thermostat switch 25, the circuits for the second bank of heating elements will remain open regardless of the closing of the switches 56 for the second bank of heating units, there being no connection between the wires 38 for the two banks of units or between the wires 35 of the two banks. Therefore, assuming that when the fourth brush 56 has engaged the fourth contact 65 to energize the fourth solenoid 45 of the first bank, the holding circuit for such solenoid will close and remain closed and the timer motor will stop.

It will be noted that the circuit for the motor is dependent upon the closing of a circuit from the wire 40 to the wire 35 and this is accomplished initially through the normally closed switches 47 which are successively opened. When the fourth solenoid 45 is energized, the normally closed switch 47 is opened, hence the motor circuit will be broken, but the holding circuit for the fourth heating element 22 will remain closed. In fact, all of the holding circuits for the first four heating elements will remain closed until the predetermined temperature is reached at which the thermostat switch 24 opens. Thus these four heating elements will remain in operation until the thermostat switch 24 opens, at which time all of the solenoid switches will open. None of the heating elements of the second bank, however, will be energized.

Assuming that the desired temperature of the water in the boiler is reached prior to energization of the fourth heating element 22 of the first bank, the thermostat switch 24 will open all of the circuits and all of the parts will be returned to normal position. The motor will stop prior to the closing of the fourth switch 56. When the system is again placed in operation, assuming that the switch 25 remains open, the sequence of operation will start by the closing of the fourth switch 56 and the timer will not energize any of the second bank of the solenoids 45, but will then pass on to the first switch 56 for the first bank and the operation will continue through the third heating unit of the first bank. This sequence of operations having started with the fourth switch 56 in the first bank, the completion of the sequence through the third switch 56 will result in the opening of the last of the four normally closed switches 47, whereupon the motor operation will stop and all four solenoids will remain operative through their holding circuits to keep the heating elements of the first bank in operation until the desired temperature is reached.

The present system is utilized with home or building heating systems in which water circulation is maintained by a circulator pump. Assuming that in cold weather the returning of relatively cool water to the furnace through the opening 18 results in dropping the temperature of the water in the boiler below the point at which the thermostat switch 25 closes, both thermostat switches 24 and 25 will close. This being the case, the wires 38 for the first and second banks will be connected to each other and the wires 35 of the first and second banks will be connected to each other through the thermostatic switch 25. Under such conditions, when the sequence of operation has passed through the fourth solenoid of the first bank of heating units, the opening of the fourth switch arm 47 will not break the motor circuit since such circuit will be maintained by the switch arms 47 of the second bank of units. Therefore the operation will continue and successive heating units 22 of the second bank will be energized in exactly the same manner as the successive heating units of the first bank as described above. Each solenoid 45 throughout the system, as energized, will close its holding circuit to maintain the associated heating element energized. When the circuit to the last solenoid of the second bank is closed, this will result in the opening of the last of the normally closed switches 47, whereupon the circuit for the motor 39 will be broken. All of the holding circuits for the heating elements will remain closed, however, until the temperature of the water reaches the predetermined maximum.

Under the conditions just described, it will be apparent that all eight of the heating elements will remain in operation, thus providing the necessary heat for relatively rapidly raising the temperature of the water to the desired point. It also will be apparent that any number of successive banks of heating units may be connected in the system, depending upon the capacity thereof, and particularly the volume of water to be heated. Any additional banks of heating units will correspond to the two shown, and there will be a thermostat switch between the second and third banks as there is between the first and second banks, and between any successive pairs of banks of heating units. Regardless of how many heating units or banks of heating units are employed, it will be apparent that these heating units are cut into operation successively, thus eliminating the sudden loading of the source. The particular B.t.u. per hour capacity of the heating elements also will be determined by the capacity of the heating system and the volume of water to be heated. In all cases, the heating units will be brought into operation successively.

It also will be noted that the switch arms for the solenoid switches are variously connected to the line wires 28, 29 and 30. This is done to balance loads of all of the heating elements on the wires 28, 29 and 30.

The system has been found to be highly efficient in operation and its use is entirely practical for home use in accordance with present-day kilowatt hour rates for electric companies. It will be apparent that with the use of a plurality of banks of heating units, all heating units or a substantial number of them will not come into operation unless necessary. For example, in mild weather when the water returns to the furnace 10 through the opening 18 it is lowered only a few degrees in temperature, and only the first bank of heating units will come into operation. This results in a definite saving of current. Moreover, it will be apparent that no particular number of heating units need be employed in each bank, the number of such units employed being determined in accordance with the nature and capacity of the heating system.

It is to be understood that the form of the invention shown and described is to be taken as a preferred example of the same and that various changes in the shape, size, and arrangement of the parts may be made as do not depart from the spirit of the invention or the scope of the appended claims.

We claim:

1. In a heating system, a plurality of heating elements, means comprising a timer operative for successively connecting said heating elements to a source, a motor for driving said timer, a thermostatic switch for energizing said motor, and control means comprising switch mechanisms successively operative by said timer for successively connecting the heating elements to a source, said control means further comprising parallel normally closed switches in circuit with said motor to be opened successively upon operation of said switch mechanisms by operation of said timer whereby upon the opening of the last of said normally closed switches, the circuit for the motor will be broken, each switch mechanism having a holding circuit for said heating elements in circuit with said thermostatic switch whereby said heating elements remain energized, after the last of said normally closed switches is opened to stop said motor, until said holding circuits are broken by the opening of said thermostatic switch.

2. In a heating system, a plurality of heating elements, means comprising a timer operative for successively connecting said heating elements to a source, a motor for driving said timer, a thermostatic switch for energizing said motor, and control means for each heating element, each control means comprising a pair of normally open switches in circuit with one of said heating elements and a normally closed switch, and solenoids successively energizable by said timer for closing the normally open switches and opening the normally closed switch of successive of said control means, said normally closed switches being in parallel in the circuit for said motor whereby the opening of the last of said normally closed switches opens the circuit to said motor to stop said timing mechanism, one normally open switch of each control means being connected in a holding circuit to maintain the associated solenoids energized after the last of said normally closed switches is opened to stop said motor, said solenoids being in circuit with said thermostatic switch to be deenergized when such switch opens.

3. In a heating system, a plurality of heating elements, a thermostatic switch, a timer, a motor connected to said timer, said thermostatic switch being in circuit with said motor and operative upon closing to initiate operation thereof, a circuit for each heating element comprising a solenoid operated switch the solenoid of which has a circuit controlled by operation of said timer whereby said solenoids are successively energized, each solenoid operated switch comprising a normally closed switch element in the circuit of said motor and a normally open switch element, said normally closed switch elements being in parallel, energization of each solenoid opening its normally closed switch element to break the motor circuit therethrough, each normally open switch element being moved to closed position upon energization of the associated solenoid to establish a holding circuit for the corresponding heating element, said holding circuits being in parallel and in circuit with said thermostatic switch whereby the opening of said thermostatic switch opens all of said holding circuits.

4. A heating system comprising a boiler, a plurality of electric heating elements in said boiler, a timer having a rotary element provided with circumferentially offset contacts, a brush for each of said contacts engageable therewith upon operation of said timer, a motor for operating said timer, a thermostatic switch subject to operation upon a drop in the temperature of the water in said boiler, a solenoid operated switch associated with each of said heating elements, each solenoid operated switch comprising first and second normally open switch elements and a normally closed switch element, a circuit for said motor including said thermostatically operable switch and all of said normally closed switch elements in parallel, a circuit for each heating element including said first and second normally open switch elements, and a circuit for each solenoid including one of said timer contacts and its associated brush, whereby, upon energization of said motor to drive said timer said brushes will successively engage their associated contacts to successively energize the solenoids to open the associated normally closed switch elements to break the parallel motor circuit therethrough and to close the normally open switch elements to thereby successively energize the heating elements, each of said second normally open switch elements, when closed, establishing a holding circuit for the associated solenoid whereby the circuits for the solenoids will be successively maintained closed upon initial energization thereof and whereby, upon the closing of the last solenoid circuit, the opening of the associated normally closed switch element will open the motor circuit.

5. A heating system comprising a boiler, a pair of electric heating elements in said boiler, a pair of thermostatic switches the first of which is subject to be closed upon a predetermined drop in boiler water temperature and the second of which is adapted to be closed upon a further drop in boiler water temperature, a rotating timer member having a pair of circumferentially offset contacts and brushes adapted to successively engage said contacts upon rotation of said timer member, a motor for driving said timer member, a pair of solenoid operated switches each of which has a plurality of switch elements one of which is normally closed and the others of which are normally open, a circuit for said motor including said thermostatically operated switches and further including in parallel the normally closed switch elements of the two solenoid operated switches, circuits for the solenoids of said solenoid operated switches respectively including said timer contacts and their associated brushes whereby, upon the closing of said first thermostatically operated switch said motor will be energized to rotate said timer member until the contact associated with one solenoid engages its associated brush to energize the associated solenoid to break the motor circuit by opening the associated normally closed switch, the respective heating elements having circuits including said normally open switches one of which, when closed, closes a holding circuit for the associated solenoid and opens its normally closed switch element, the circuit for said motor thereby being broken unless the second thermostatically operated switch is closed under which conditions the normally closed switch element of the second solenoid operated switch will maintain said motor circuit closed until the associated solenoid is energized.

6. A system according to claim 5 provided with a three phase current source, the circuits for the two heating elements being connected across different pairs of wires of said three phase source to balance the loads thereon.

7. A heating system comprising a boiler, a plurality of sets of electric heating elements in said boiler, a pair of thermostatically operated switches one of which is adapted to be closed upon a predetermined drop in boiler water temperature and the other of which is adapted to be closed upon a further drop in boiler water temperature, a rotary timer member having a plurality of circumferentially offset contacts corresponding in number to said heating elements, a brush engageable with each contact, a motor connected to said timer member to rotate it, a solenoid operated switch associated with each heating element, each such switch having a pair of normally open switch elements and a normally closed switch element, a circuit for said motor including in parallel all of said normally closed switch elements and further including in parallel said thermostatically operated switches, said other thermostatically operated switch being between said sets of heating elements, a circuit for the solenoid of each solenoid operated switch including one of said contacts and its associated brush whereby, upon the closing of said one thermostatically operated switch, one solenoid at a time will be energized to open the associated normally closed switch element to open the motor circuit at that point and to close the normally open switch elements to complete a circuit through the associated heating element, the motor circuit thus being maintained closed by the remaining normally closed switch elements of the solenoid operated switches associated with one set of heating elements so that the motor circuit will be broken upon energization of the last solenoid associated with such set of heating elements, a holding circuit for each solenoid closed by the closing of one of the normally open switch elements associated with such solenoid to maintain the associated heating elements energized, the closing of said other thermostatically operated switch maintaining the motor circuit closed through the normally closed switch elements of the solenoid operated switches associated with the other set of heating elements until the last such solenoid is energized whereupon the motor circuit will be broken but all solenoids will remain energized until boiler water temperature rises.

8. A system according to claim 7 provided with a three phase source of current supply for the system, all of the normally closed switch elements of said solenoids being connected to one wire of said three phase circuit, said normally open switch elements being connected across various pairs of wires of said three phase circuit to balance the loads thereon.

References Cited in the file of this patent

UNITED STATES PATENTS

| | | |
|---|---|---|
| 1,607,077 | Hands | Nov. 16, 1926 |
| 2,157,910 | McCormick | May 9, 1939 |
| 2,410,384 | Lindsay | Oct. 29, 1946 |
| 2,568,700 | Armstrong | Sept. 25, 1951 |
| 2,625,661 | Haydon | Jan. 13, 1953 |
| 2,746,001 | Holmes et al. | May 15, 1956 |
| 2,788,416 | Kilbury | Apr. 9, 1957 |
| 2,993,106 | Maudlin et al. | July 18, 1961 |